(12) United States Patent
Armstrong et al.

(10) Patent No.: US 12,196,106 B2
(45) Date of Patent: Jan. 14, 2025

(54) TIE FOR A COMPONENT

(71) Applicant: ROLLS-ROYCE plc, London (GB)

(72) Inventors: Joshua Armstrong, St. Albans (GB); Dann Cascano, Derby (GB); Jaideep Y. Thar, Derby (GB); Sophie Harrison, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/495,899

(22) Filed: Oct. 27, 2023

(65) Prior Publication Data

US 2024/0159155 A1 May 16, 2024

(30) Foreign Application Priority Data

Nov. 10, 2022 (GB) ..................................... 2216739

(51) Int. Cl.
| | | |
|---|---|---|
| *F01D 5/26* | (2006.01) | |
| *B33Y 80/00* | (2015.01) | |
| *F01D 9/04* | (2006.01) | |

(52) U.S. Cl.
CPC .............. *F01D 5/26* (2013.01); *F01D 9/041* (2013.01); *B33Y 80/00* (2014.12); *F05D 2250/712* (2013.01)

(58) Field of Classification Search
CPC ...... F01D 5/26; F01D 9/041; F05D 2250/712; B33Y 80/00
See application file for complete search history.

(56) References Cited

U.S. PATENT DOCUMENTS

| | | | |
|---|---|---|---|
| 4,207,027 A | 6/1980 | Barry et al. | |
| 8,052,378 B2* | 11/2011 | Draper | F01D 5/186 |
| | | | 415/121.2 |
| 8,109,726 B2* | 2/2012 | Liang | F01D 5/187 |
| | | | 416/97 R |

(Continued)

FOREIGN PATENT DOCUMENTS

| | | |
|---|---|---|
| EP | 2933435 A1 | 10/2015 |
| EP | 4198269 A1 | 6/2023 |

(Continued)

OTHER PUBLICATIONS

Great Britain search report dated Apr. 21, 2023, issued in GB Patent Application No. 2216739.9.

(Continued)

*Primary Examiner* — David E Sosnowski
*Assistant Examiner* — Aye S Htay (57) ABSTRACT

A tie for a component includes a body including an elongate portion and an arch disposed adjacent to the elongate portion. The arch includes first and second middle surfaces extending between a pair of first and second outer curved surfaces, respectively. The body defines a minimum cross-sectional plane perpendicular to a longitudinal axis and passing through the elongate portion. The body further includes a minimum tie width at the minimum cross-sectional plane along a second transverse axis. The minimum tie width is greater than each of a first minimum arch width of the first middle surface and a second minimum arch width of the second middle surface by a width factor greater than or equal to 3 to less than or equal to 10.

20 Claims, 8 Drawing Sheets

(56) References Cited

U.S. PATENT DOCUMENTS

| | | | |
|---|---|---|---|
| 8,172,534 B2* | 5/2012 | Ammann | F01D 5/187 416/97 R |
| 2013/0232991 A1 | 9/2013 | Otero | |
| 2014/0033736 A1* | 2/2014 | Propheter-Hinckley | F01D 5/186 415/173.1 |
| 2014/0321980 A1* | 10/2014 | Lee | F01D 5/187 415/115 |
| 2015/0322797 A1 | 11/2015 | Snyder et al. | |
| 2016/0069191 A1 | 3/2016 | Lutjen et al. | |
| 2016/0169003 A1* | 6/2016 | Wong | F01D 9/041 415/115 |
| 2017/0030399 A1 | 2/2017 | Sanders et al. | |
| 2018/0066537 A1 | 3/2018 | Radomski et al. | |
| 2018/0283691 A1 | 10/2018 | Corsmeier et al. | |
| 2020/0190988 A1* | 6/2020 | Osgood | F01D 5/187 |
| 2021/0131289 A1 | 5/2021 | Whitaker et al. | |

FOREIGN PATENT DOCUMENTS

| | | |
|---|---|---|
| FR | 2392222 A1 | 12/1978 |
| FR | 3107919 A1 | 9/2021 |
| WO | 2022045983 A1 | 3/2022 |

OTHER PUBLICATIONS

European search report dated Mar. 4, 2024, issued in EP Patent Application No. 23202990.0.

* cited by examiner

TIE FOR A COMPONENT

CROSS-REFERENCE TO RELATED APPLICATIONS

This specification is based upon and claims the benefit of priority from United Kingdom patent application number GB 2216739.9 filed on Nov. 10, 2022, the entire contents of which is incorporated herein by reference.

BACKGROUND

Technical Field

The present disclosure generally relates to a tie for a component, a component that includes such a tie, and a gas turbine engine that includes such a tie.

Description of the Related Art

Compressors of gas turbine engines typically include alternating rotors and stators, which compress air in use. A first stator (or "stator vane") provided at an inlet to a core of the gas turbine engine, downstream of an intake fan, is termed as "Engine Section Stator" (ESS) or "core inlet stator". ESS vanes guide air flow entering the core of the gas turbine engine.

ESS vanes generally include internal fluid flow passageways for transferring fluids, such as bearing chamber and gearbox fluids (e.g., oil, air, etc.). Such passages may typically include vibration damping structural ties for supporting internal passageway walls. Fluid flow disruption through the fluid flow passageway should be minimal.

The current solution for certain turbofan engines involves using removable support structures to ensure the ties are printed correctly using additive manufacturing techniques. The current solution is not feasible for gas turbine engines where a shape of the fluid flow passageway provides very limited access for the support structures to be easily removed or otherwise used for producing the ties.

SUMMARY

According to a first aspect, there is provided a tie for a component having a first wall, a second wall spaced apart from the first wall, and a fluid passageway defined between the first wall and the second wall. The tie includes a body defining a longitudinal axis extending along its length between the first wall and the second wall, a first longitudinal end extending along the longitudinal axis, a second longitudinal end opposing the first longitudinal end and extending along the longitudinal axis, a first transverse axis perpendicular to the longitudinal axis and extending between the first longitudinal end and the second longitudinal end, and a second transverse axis perpendicular to each of the longitudinal axis and the first transverse axis. The body includes a first wide portion fixedly coupled to the first wall. The body further includes a second wide portion opposing the first wide portion and fixedly coupled to the second wall. The body further includes an elongate portion extending between the first wide portion and the second wide portion along the longitudinal axis. The elongate portion is disposed at the first longitudinal end. The body further includes an arch disposed at the second longitudinal end and adjacent to the elongate portion. The arch extends between the first wide portion and the second wide portion at least partially along the longitudinal axis. The arch curves concavely towards the elongate portion from each of the first wide portion and the second wide portion to an apex of the arch. The arch includes a pair of first outer curved surfaces opposing each other and curving convexly from the first wide portion at least partially along the second transverse axis. The arch further includes a pair of second outer curved surfaces opposing each other and curving convexly from the second wide portion at least partially along the second transverse axis. The arch further includes a first middle surface extending between the pair of first outer curved surfaces with respect to the second transverse axis. The first middle surface including a first minimum arch width along the second transverse axis. The arch further includes a second middle surface extending between the pair of second outer curved surfaces with respect to the second transverse axis. The second middle surface including a second minimum arch width along the second transverse axis. The body further defines a minimum cross-sectional plane perpendicular to the longitudinal axis and passing through the elongate portion. The apex of the arch lies within the minimum cross-sectional plane. The body further includes a minimum tie width at the minimum cross-sectional plane along the second transverse axis. The minimum tie width is greater than each of the first minimum arch width and the second minimum arch width by a width factor greater than or equal to 3 to less than or equal to 10.

The fluid passageway may receive a fluid flowing along the second transverse axis. The tie of the present disclosure may provide minimal flow disruption to the fluid received within the fluid passageway since the width factor (i.e., a ratio of the minimum tie width to the first minimum arch width or the second minimum arch width) is greater than or equal to 3 and less than or equal to 10. A larger value of the width factor may indicate that the portion of the tie where the tie has the largest cross-sectional area (i.e., the cross-sectional area of the tie adjacent to the first and second middle surfaces) may not extend as long in a direction of the flow of the fluid, i.e., along the second transverse axis.

Additionally, a shape of the tie of the present disclosure may ensure that the tie is sufficiently supported to be printable using additive layer manufacturing (ALM). A build direction of the tie may be disposed along the first transverse axis. The arch (having a gothic arch shape) may ensure that the tie is built correctly by supporting an overhanging material (i.e., the elongate portion of the tie) along the build direction of the tie. Thus, the tie of the present disclosure may not require use of additional support structures. At the same time, the tie may minimise fluid flow losses associated with the fluid flowing past them, thereby improving fluid flow efficiency.

The component may be any suitable component. The component may be a gas turbine engine component, for example a stator vane including an engine section stator vane or a core inlet stator vane. However the component may be some other gas turbine engine component or other component, which may typically be a hollow component such as a pipe, duct or vane. The tie may support walls of one or more of such hollow components.

In some embodiments, the width factor is equal to 6. This value of the width factor may provide minimal flow disruption to the flow of the fluid within the fluid passageway while ensuring that the tie may be printed using additive manufacturing techniques.

In some embodiments, the first minimum arch width is equal to the second minimum arch width. Thus, the fluid flow losses may be minimal along both the first and second middle surfaces.

In some embodiments, the body further includes a pair of first transition surfaces extending from the first wide portion towards the second wide portion and disposed between the elongate portion and respective opposing sides of the arch. Each of the pair of first transition surfaces includes a first transition radius of curvature. In some embodiments, the body further includes a pair of second transition surfaces extending from the second wide portion towards the first wide portion and disposed between the elongate portion and the respective opposing sides of the arch. Each of the pair of second transition surfaces including a second transition radius of curvature. In some embodiments, the body further includes a minimum tie thickness at the minimum cross-sectional plane along the first transverse axis. In some embodiments, the minimum tie thickness is greater than each of the first transition radius of curvature and the second transition radius of curvature by a first thickness factor of greater than 1 and less than or equal to 3.

The first thickness factor (i.e., a ratio of the minimum tie thickness to the first transition radius of curvature or the second transition radius of curvature) may be greater than 1 and less than or equal to 3. A lower value of the first thickness factor may indicate a smoother transition of the surfaces of the tie along a flow direction of the fluid (i.e., along the second transverse axis), thereby further reducing the fluid flow losses. In other words, the first thickness factor may indicate that edges of the tie may be blended as smoothly as possible to minimise the flow disruption and pressure losses.

In some embodiments, the first thickness factor is equal to 2.67. This value of the first thickness factor may provide smooth flow of the fluid along the surfaces of the tie while ensuring that the tie may be printed with an acceptable surface finish.

In some embodiments, each of the pair of first transition surfaces curves concavely from the elongate portion to the respective opposing sides of the arch. Thus, each of the pair of first transition surfaces may ensure minimum flow disruption to the flow of the fluid.

In some embodiments, each of the pair of second transition surfaces curves concavely from the elongate portion to the respective opposing sides of the arch. Thus, each of the pair of second transition surfaces may ensure minimum flow disruption to the flow of the fluid.

In some embodiments, the first transition radius of curvature is equal to the second transition radius of curvature. Thus, the fluid flow losses may be minimal along both the pair of first and second transition surfaces.

In some embodiments, the arch further includes a concave central surface extending between the first middle surface and the second middle and intersecting with the minimum cross-sectional plane. In some embodiments, the arch further includes a pair of first intermediate surfaces disposed proximal to the first wide portion. Each of the pair of first intermediate surfaces extends between the concave central surface and a corresponding first transition surface from the pair of first transition surfaces. Each of the pair of first intermediate surfaces includes a first intermediate radius of curvature. In some embodiments, the arch further includes a pair of second intermediate surfaces disposed proximal to the second wide portion and spaced apart from the pair of first intermediate surfaces. Each of the pair of second intermediate surfaces extends between the concave central surface and a corresponding second transition surface from the pair of second transition surfaces. Each of the pair of second intermediate surfaces includes a second intermediate radius of curvature. In some embodiments, the minimum tie thickness is greater than each of the first intermediate radius of curvature and the second intermediate radius of curvature by a second thickness factor of greater than 1 and less than or equal to 2.

The second thickness factor (i.e., a ratio of the minimum tie thickness to the first intermediate radius of curvature or the second intermediate radius of curvature) may be greater than 0.5 and less than or equal to 2. A lower value of the second thickness factor may indicate a smoother transition of the surfaces of the tie along the flow direction of the fluid, thereby further reducing the fluid flow losses. In other words, the second thickness factor may indicate that edges of the tie may be blended as smoothly as possible to minimise the flow disruption and the pressure losses.

In some embodiments, the second thickness factor is equal to 1.6. This value of the second thickness factor may provide smooth flow of the fluid along the surfaces of the tie while ensuring that the tie may be printed with an acceptable surface finish.

In some embodiments, each of the pair of first intermediate surfaces curves concavely from the corresponding first transition surface to the concave central surface. Thus, each of the pair of first intermediate surfaces may ensure minimum flow disruption to the flow of the fluid.

In some embodiments, each of the pair of second intermediate surfaces curves concavely from the corresponding second transition surface to the concave central surface. Thus, each of the pair of second intermediate surfaces may ensure minimum flow disruption to the flow of the fluid.

In some embodiments, the first intermediate radius of curvature is equal to the second intermediate radius of curvature. Thus, the fluid flow losses may be minimal along both the pair of first and second intermediate surfaces.

In some embodiments, a ratio between the minimum tie width and the minimum tie thickness is 3:2. This ratio between the minimum tie width and the minimum tie thickness may maximize a flow area within the fluid passageway while allowing the tie to be printed with an acceptable surface finish.

In some embodiments, the elongate portion curves concavely towards the arch at the first longitudinal end. This may further reduce the flow disruption and the pressure losses associated with the fluid flowing though the fluid passageway.

In some embodiments, each of the first wide portion and the second wide portion tapers towards the elongate portion. Thus, the first and second wide portions may reduce the flow disruption and the pressure losses associated with the fluid flowing the fluid passageway.

In some embodiments, the body further includes a teardrop cross-sectional shape or an oval cross-sectional shape at the minimum cross-sectional plane. The cross-sectional shape of the body may be rounded and as smooth as possible to minimise the flow disruption and the pressure losses.

In some embodiments, the each of the first middle surface and the second middle surface is at least piecewise planar. Thus, each of the first middle surface and the second middle surface may provide minimal flow disruption to the flow of the fluid.

In some embodiments, the minimum cross-sectional plane forms a first plane of symmetry of the tie. In some embodiments, a longitudinal plane orthogonal to the minimum cross-sectional plane and containing the longitudinal axis forms a second plane of symmetry of the tie. The first and second plane of symmetries may allow uniform flow of the fluid along the surface of the tie on either side of the first and second plane of symmetries. Further, the first and second plane of symmetries may facilitate manufacturing of the tie.

In some embodiments, the tie is formed as a single unitary component by additive layer manufacturing. This may facilitate manufacturing of the tie while minimizing flow disruption and pressure losses associated with the fluid flowing through the fluid passageway.

According to a second aspect, there is provided a gas turbine engine including the tie of the first aspect.

According to a third aspect, there is provided a component for a gas turbine engine. The component includes a first wall, a second wall opposing the first wall, and a fluid passageway defined between the first wall and the second wall. The fluid passageway is configured to receive a fluid therein. The component further includes at least one tie of the first aspect disposed within the fluid passageway. The first wide portion of the at least one tie is fixedly coupled to the first wall. The second wide portion of the at least one tie is fixedly coupled to the second wall. The fluid flows within the fluid passageway along the second transverse axis of the body of the at least one tie.

According to a fourth aspect, there is provided a gas turbine engine including the component of the third aspect. In some embodiments, the component is an engine section stator vane. Thus, the at least one tie may provide vibration damping structural support to walls of the engine section stator vane that define the fluid passageway. Further, the at least one tie may allow the fluid to readily pass through the fluid passageway of the engine section stator vane with minimal flow disruption. The at least one tie may be produced through additive layer manufacturing techniques without the need to use removable support structures during manufacturing.

According to a fifth aspect, there is provided a method of manufacturing a component of a gas turbine engine. The method includes forming a first wall and a second wall opposing the first wall. The first wall and the second wall define a fluid passageway therebetween. The method further includes forming at least one tie of the first aspect, such that the first wide portion of the at least one tie is fixedly coupled to the first wall and the second wide portion of the at least one tie is fixedly coupled to the second wall.

In some embodiments, the at least one tie is formed by additive layer manufacturing.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example, one, two, or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e., the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
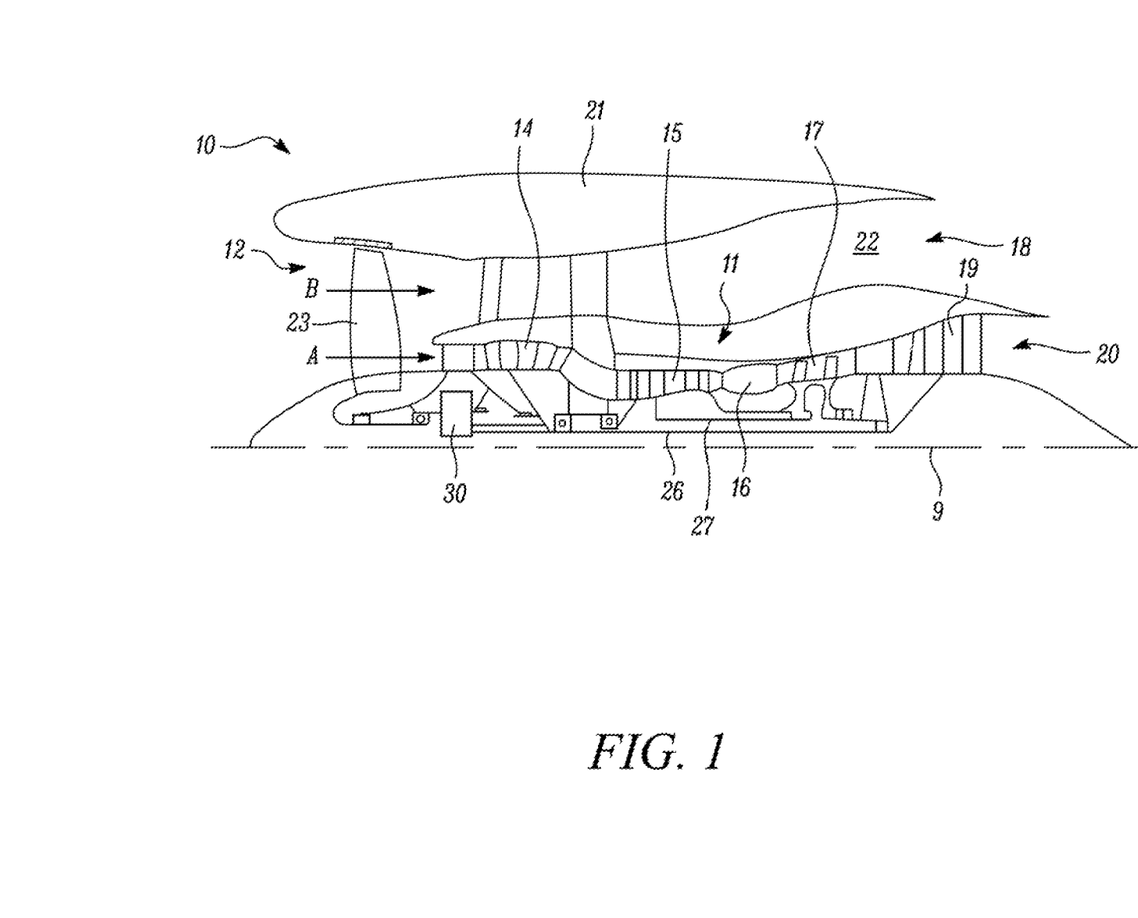
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
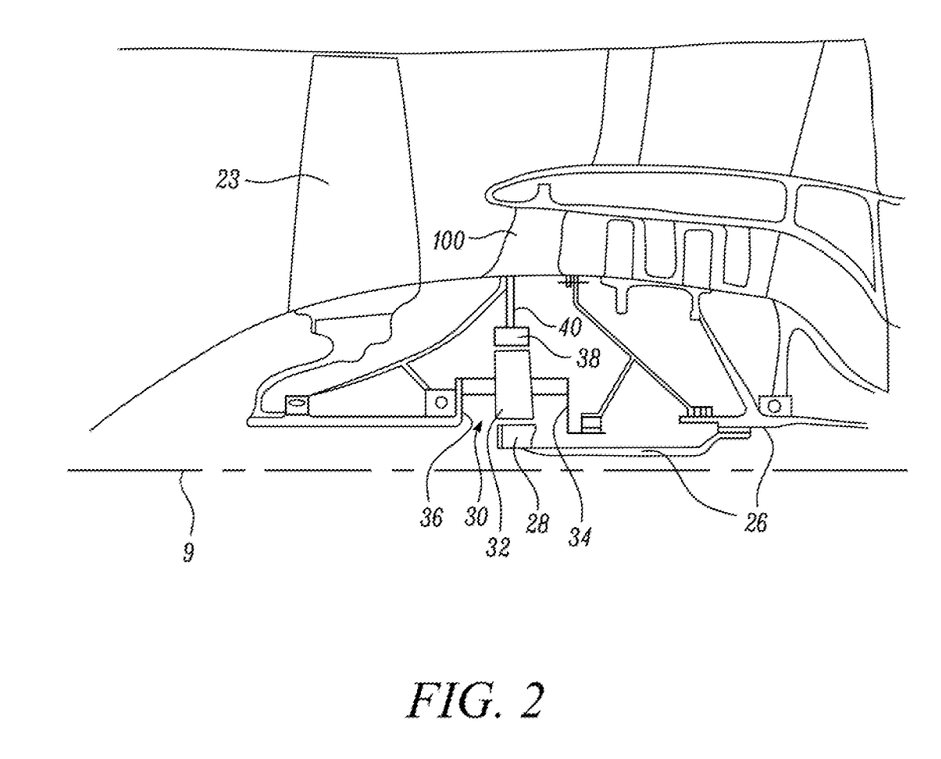
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or a sun gear 28 of the epicyclic gearbox 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the principal rotational axis 9. Radially outwardly of the planet gears 32 and intermeshing therewith is an annulus or ring gear 38 that is coupled, via linkages 40, to a component 100 (a stationary supporting structure) of the gas turbine engine 10.

In some embodiments, the component 100 is an engine section stator (ESS) vane or a core inlet stator vane. In some embodiments, the component 100 is provided at an inlet to the engine core 11 (shown in FIG. 1) and rear of the fan 23 (shown in FIG. 1). In some embodiments, the component 100 may guide the core airflow A entering the engine core 11 of the gas turbine engine 10. In some embodiments, the gas turbine engine 10 includes multiple components 100 spaced circumferentially around the principal rotational axis 9 at the inlet to the engine core 11 of the gas turbine engine 10.

Note that the terms "low pressure turbine" and "low pressure compressor" as used herein may be taken to mean the lowest pressure turbine stages and lowest pressure compressor stages (i.e., not including the fan 23), respectively, and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Accordingly, the present disclosure extends to a gas turbine engine having any arrangement of gearbox styles (for example, star or planetary), support structures, input and output shaft arrangement, and bearing locations. Optionally, the epicyclic gearbox 30 may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the engine core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle), or turboprop engine, for example. In some arrangements, the gas turbine engine 10 may not comprise the epicyclic gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

Figure 3A:
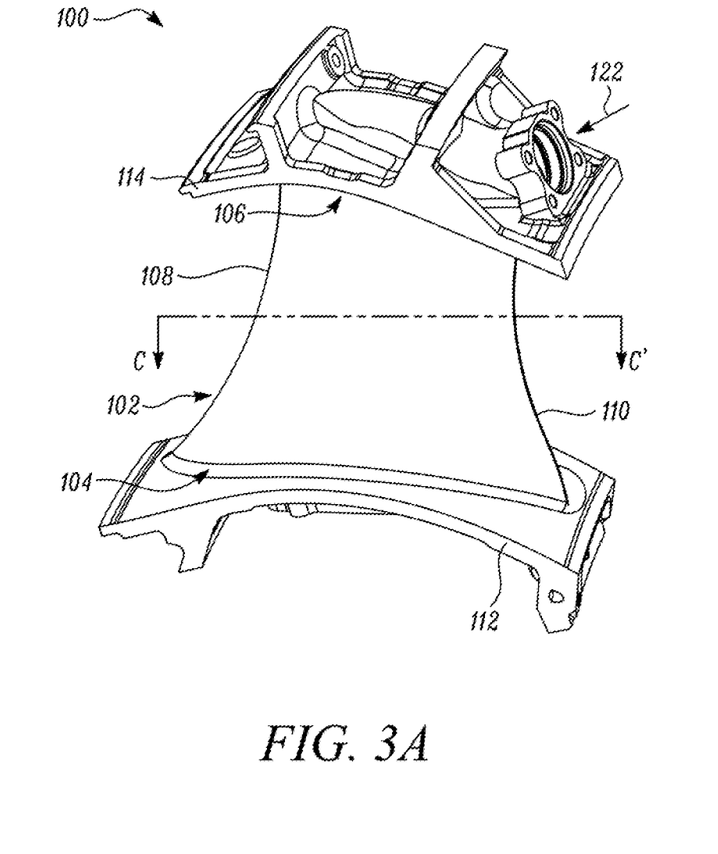
FIG. 3A is a schematic side perspective view of a component of the gas turbine engine, according to an embodiment of the present disclosure.

FIG. 3A is a schematic side perspective view of the component 100 for the gas turbine engine 10 (shown in FIG. 1). In some embodiments, the component 100 includes an aerofoil 102 including a radially inner end 104, a radially outer end 106, a leading edge 108, and a trailing edge 110. In some embodiments, the component 100 further includes an inner annulus wall 112 coupled to the radially inner end 104 of the aerofoil 102 and an outer annulus wall 114 coupled to the radially outer end 106 of the aerofoil 102. The inner annulus walls 112 and the outer annulus walls 114 of multiple such components 100 may be arranged side by side around the principal rotational axis 9 (shown in FIGS. 1 and 2) of the gas turbine engine 10 to form a ring (i.e., the engine section stator).

In some embodiments, the component 100 may be integrally manufactured using additive layer manufacturing (ALM), e.g., through electron beam melting. However, in alternative embodiments, any other manufacturing method may be utilized based on application requirements.

Figure 3B:
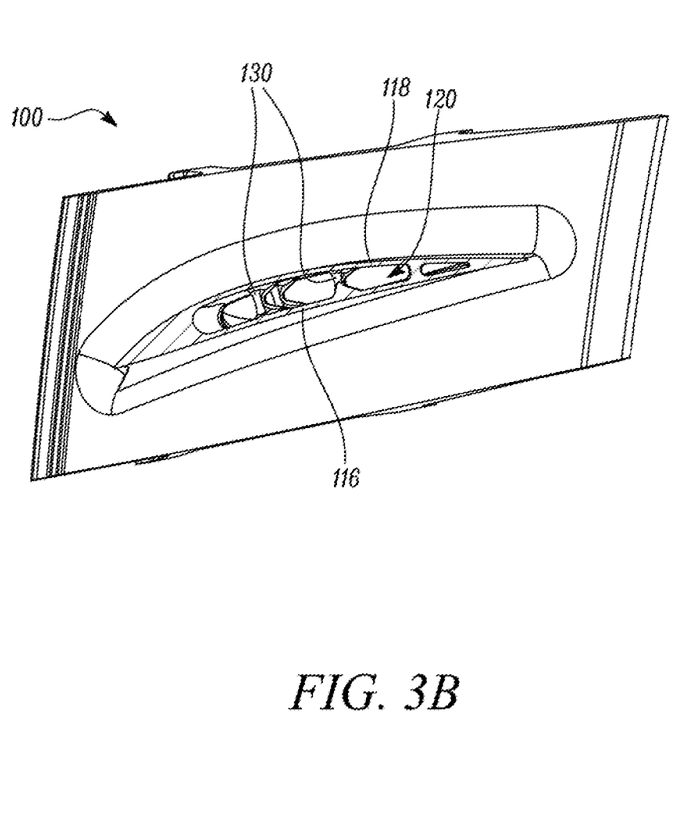
FIG. 3B is a schematic sectional view of the component taken along a section line C-C' shown in FIG. 3A.

FIG. 3B is a schematic sectional view of the component 100 taken along a section line C-C' shown in FIG. 3A. Referring now to FIGS. 3A and 3B, the component 100 (or the aerofoil 102) further includes a first wall 116, a second wall 118 opposing the first wall 116, and a fluid passageway 120 defined between the first wall 116 and the second wall 118. In some embodiments, the fluid passageway 120 is configured to receive a fluid 122 (shown in FIG. 3A) therein. For example, the fluid passageway 120 may be configured to receive gearbox and/or bearing chamber fluids, such as oil, air, etc.

The component 100 further includes at least one tie 130 disposed within the fluid passageway 120. In the illustrated embodiment of FIG. 3B, the component 100 has multiple ties 130. In some embodiments, the at least one tie 130 may provide vibration damping structural support to walls of the fluid passageway 120, i.e., the first wall 116 and the second wall 118. The term "at least one tie 130" is interchangeably referred to hereinafter as the "tie 130". In some embodiments, the tie 130 is formed as a single unitary component by ALM. However, in alternative embodiments, any other manufacturing method may be utilized based on application requirements.

It should be understood that the component 100 may be any component of the gas turbine engine 10 (shown in FIG. 1). For example, the gas turbine engine 10 may include the tie 130 disposed within other hollow components, e.g., pipes, ducts, vanes, etc., to support walls of such hollow components.

Figure 4:
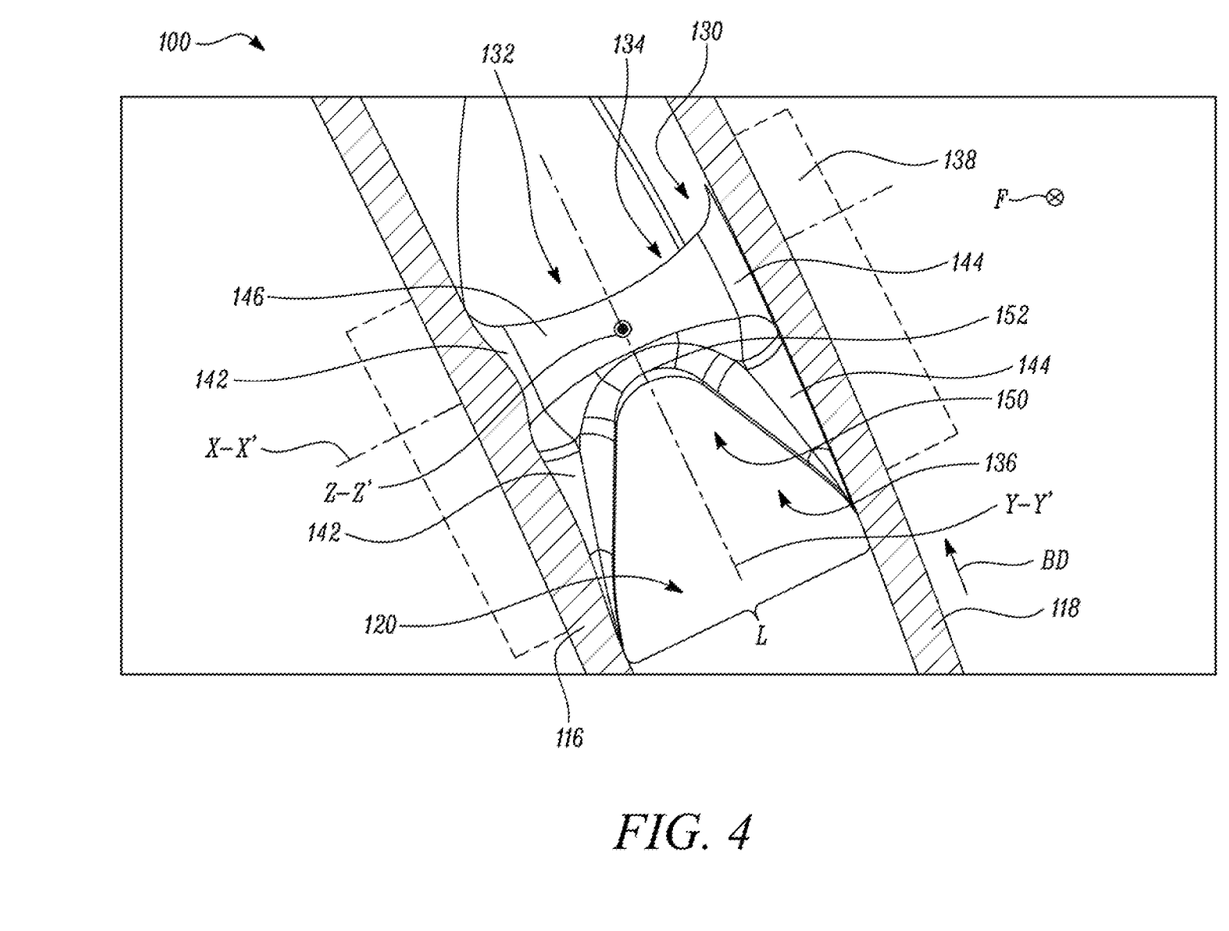
FIG. 4 is an enlarged schematic sectional view of a portion of the component taken along the section line C-C' shown in FIG. 3A.

FIG. 4 is a schematic enlarged sectional view of a portion of the component 100 taken along the section line C-C' shown in FIG. 3A. In some embodiments, the tie 130 includes a body 132 defining a longitudinal axis X-X' extending along its length L between the first wall 116 and the second wall 118, a first longitudinal end 134 extending along the longitudinal axis X-X', a second longitudinal end 136 opposing the first longitudinal end 134 and extending along the longitudinal axis X-X, a first transverse axis Y-Y' perpendicular to the longitudinal axis X-X' and extending between the first longitudinal end 134 and the second longitudinal end 136, and a second transverse axis Z-Z' perpendicular to each of the longitudinal axis X-X' and the first transverse axis Y-Y'. In some embodiments, the fluid 122 (shown in FIG. 3A) flows within the fluid passageway 120 in a flow direction F disposed along the second transverse axis Z-Z' of the body 132 of the tie 130.

The body 132 includes a first wide portion 142 fixedly coupled to the first wall 116, a second wide portion 144 opposing the first wide portion 142 and fixedly coupled to the second wall 118, and an elongate portion 146 extending between the first wide portion 142 and the second wide portion 144 along the longitudinal axis X-X'. The elongate portion 146 is disposed at the first longitudinal end 134. In some embodiments, each of the first wide portion 142 and the second wide portion 144 tapers towards the elongate portion 146. Thus, the first and second wide portions 142, 144 may reduce flow disruption and pressure losses as the fluid 122 (shown in FIG. 3A) flows through the fluid passageway 120 along the flow direction F. Reference numerals 142 and 144 are shown multiple times in FIG. 4 and subsequent Figures for the purpose of clarity.

In some embodiments, the first wide portion 142, the second wide portion 144, and the elongate portion 146 may be produced together with the component 100 through ALM. Thus, the first wide portion 142 may be integrally formed with the first wall 116 and the second wide portion 144 may be integrally formed with the second wall 118.

The body 132 further includes an arch 150 disposed at the second longitudinal end 136 and adjacent to the elongate portion 146. The arch 150 extends between the first wide portion 142 and the second wide portion 144 at least partially along the longitudinal axis X-X'. The arch 150 curves concavely towards the elongate portion 146 from each of the first wide portion 142 and the second wide portion 144 to an apex 152 of the arch 150. In some embodiments, the arch 150 may be a gothic shaped arch.

In some embodiments, the arch 150 may ensure that the tie 130 is built correctly using ALM by supporting an overhanging material (i.e., the elongate portion 146 of the tie 130) along a build direction BD of the tie 130. Thus, the tie 130 of the present disclosure may not require use of additional support structures. Thus, the tie 130 of the present disclosure is suitably shaped such that the tie 130 is sufficiently supported to be printable using ALM.

Figure 5:
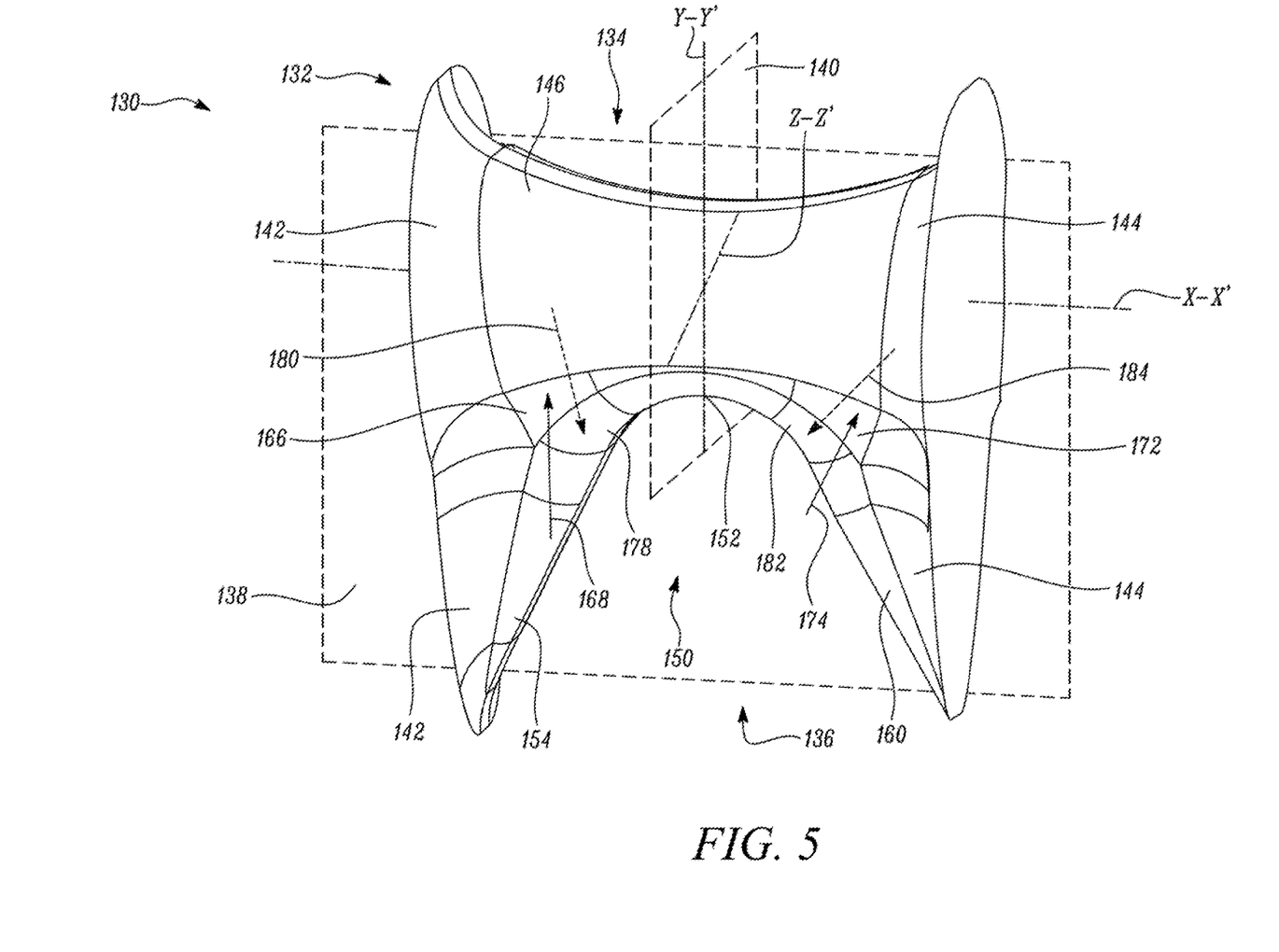
FIG. 5 is a schematic perspective view of the tie for the component shown in FIGS. 3A, 3B and 4.
Figure 6A:
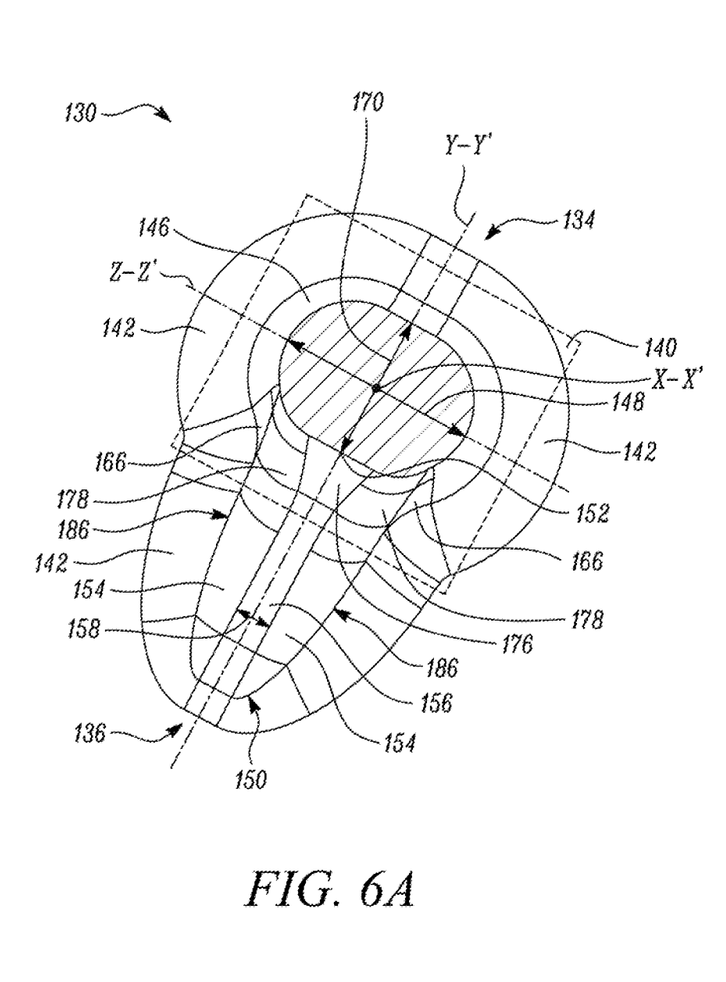
FIG. 6A is a schematic top sectional view of the tie, taken along a minimum cross-sectional plane.
Figure 6B:
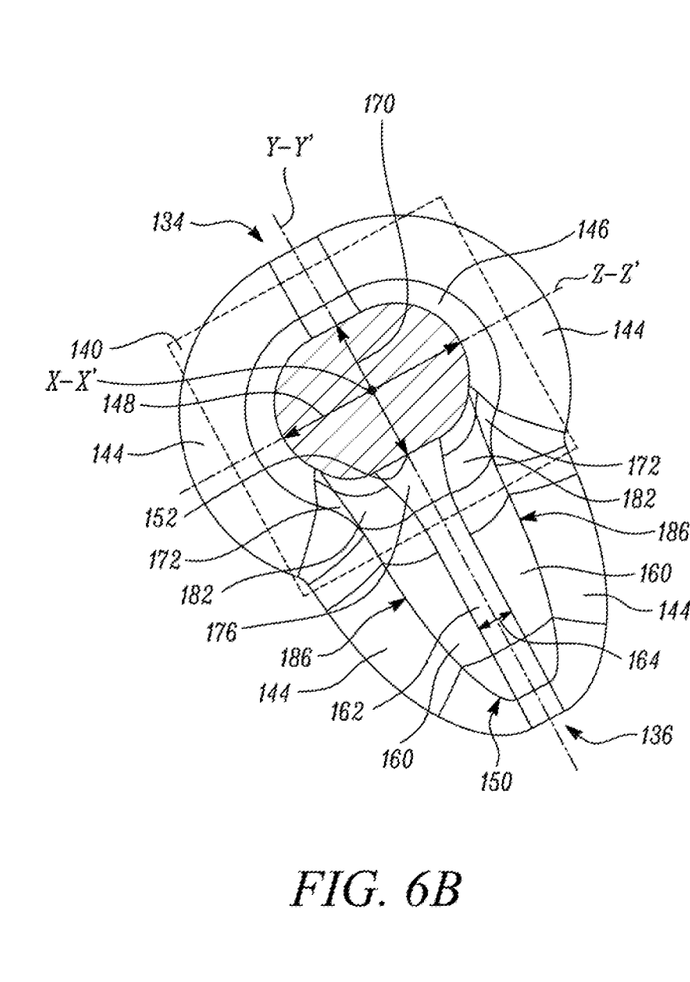
FIG. 6B is a schematic bottom sectional view of the tie, taken along a minimum cross-sectional plane.

FIG. 5 is a schematic perspective view of the tie 130. FIGS. 6A and 6B are schematic top and bottom sectional views of the tie 130 taken along a minimum cross-sectional plane 140 shown in FIG. 4. Referring now to FIGS. 4-6B, the arch 150 includes a pair of first outer curved surfaces 154 (shown in FIGS. 5 and 6A) opposing each other and curving convexly from the first wide portion 142 at least partially along the second transverse axis Z-Z'. The arch 150 further includes a first middle surface 156 (shown in FIG. 6A) extending between the pair of first outer curved surfaces 154 with respect to the second transverse axis Z-Z'. The first middle surface 156 includes a first minimum arch width 158 along the second transverse axis Z-Z'.

The arch 150 further includes a pair of second outer curved surfaces 160 (shown in FIGS. 5 and 6B) opposing each other and curving convexly from the second wide portion 144 at least partially along the second transverse axis Z-Z'. The arch 150 further includes a second middle surface 162 (shown in FIG. 6B) extending between the pair of second outer curved surfaces 160 with respect to the second transverse axis Z-Z'. The second middle surface 162 includes a second minimum arch width 164 along the second transverse axis Z-Z'. In some embodiments, each of the first middle surface 156 and the second middle surface 162 is at least piecewise planar. In some embodiments, the first minimum arch width 158 is equal to the second minimum arch width 164.

The body 132 further defines the minimum cross-sectional plane 140 perpendicular to the longitudinal axis X-X' and passing through the elongate portion 146. In some embodiments, the minimum cross-sectional plane 140 forms a first plane of symmetry of the tie 130. The apex 152 of the arch 150 lies within the minimum cross-sectional plane 140. In some embodiments, a longitudinal plane 138 (shown in FIGS. 4 and 5) orthogonal to the minimum cross-sectional plane 140 and containing the longitudinal axis X-X' forms a second plane of symmetry of the tie 130.

The body 132 further includes a minimum tie width 148 (shown in FIGS. 6A and 6B) at the minimum cross-sectional plane 140 along the second transverse axis Z-Z'. The minimum tie width 148 is greater than each of the first minimum arch width 158 and the second minimum arch width 164 by a width factor greater than or equal to 3 to less than or equal to 10. In some embodiments, the width factor is greater than or equal to 4, greater than or equal to 5, greater than or equal to 6, greater than or equal to 7, greater than or equal to 8, or greater than or equal to 9. In some embodiments, the width factor is equal to 6.

The tie 130 of the present disclosure may provide minimal flow disruption to the fluid 122 (shown in FIG. 3A) received within the fluid passageway 120 since the width factor (i.e., a ratio of the minimum tie width 148 to the first minimum arch width 158 or the second minimum arch width 164) is greater than or equal to 3 and less than or equal to 10. A larger value of the width factor may indicate that the portion of the tie 130 where the tie 130 has the largest cross-sectional area (i.e., the cross-sectional area of the tie 130 adjacent to the first and second middle surfaces 156, 162) may not extend as long in the flow direction F (shown in FIG. 4) of the fluid 122 along the second transverse axis Z-Z'.

In some embodiments, the body 132 further includes a pair of first transition surfaces 166 (shown in FIGS. 5 and 6A) extending from the first wide portion 142 towards the second wide portion 144 and disposed between the elongate portion 146 and respective opposing sides 186 of the arch 150. In some embodiments, each of the pair of first transition surfaces 166 curves concavely from the elongate portion 146 to the respective opposing sides 186 of the arch 150. In some embodiments, each of the pair of first transition surfaces 166 includes a first transition radius of curvature 168 (shown in FIG. 5).

In some embodiments, the body 132 further includes a pair of second transition surfaces 172 (shown in FIGS. 5 and 6B) extending from the second wide portion 144 towards the first wide portion 142 and disposed between the elongate portion 146 and the respective opposing sides 186 of the arch 150. In some embodiments, each of the pair of second transition surfaces 172 curves concavely from the elongate portion 146 to the respective opposing sides 186 of the arch 150. In some embodiments, each of the pair of second transition surfaces 172 includes a second transition radius of curvature 174 (shown in FIG. 5). In some embodiments, the first transition radius of curvature 168 is equal to the second transition radius of curvature 174.

In some embodiments, the body 132 further includes a minimum tie thickness 170 (shown in FIGS. 6A and 6B) at the minimum cross-sectional plane 140 along the first transverse axis Y-Y'. In some embodiments, the minimum tie thickness 170 is greater than each of the first transition radius of curvature 168 and the second transition radius of curvature 174 by a first thickness factor of greater than 1 and less than or equal to 3. In some embodiments, the first thickness factor is greater than 2 and less than or equal to 3. In some embodiments, the first thickness factor is equal to 2.67.

A lower value of the first thickness factor (i.e., a ratio of the minimum tie thickness 170 to the first transition radius of curvature 168 or the second transition radius of curvature 174) may indicate a smoother transition of surfaces of the tie 130 along the flow direction F (shown in FIG. 4) of the fluid 122 (shown in FIG. 3A), thereby further reducing the fluid flow losses. In other words, the first thickness factor may indicate that edges of the tie 130 may be blended as smoothly as possible to minimise the flow disruption and the pressure losses.

In some embodiments, the arch 150 further includes a concave central surface 176 (shown in FIGS. 6A and 6B) extending between the first middle surface 156 (shown in FIG. 6A) and the second middle surface 162 (shown in FIG. 6B) and intersecting with the minimum cross-sectional plane 140. In some embodiments, the arch 150 further includes a pair of first intermediate surfaces 178 (shown in FIGS. 5 and 6A) disposed proximal to the first wide portion 142. In some embodiments, each of the pair of first intermediate surfaces 178 extends between the concave central surface 176 and a corresponding first transition surface 166 from the pair of first transition surfaces 166. In some embodiments, each of the pair of first intermediate surfaces 178 curves concavely from the corresponding first transition surface 166 to the concave central surface 176. In some embodiments, each of the pair of first intermediate surfaces 178 incudes a first intermediate radius of curvature 180 (shown in FIG. 5).

In some embodiments, the arch 150 further includes a pair of second intermediate surfaces 182 (shown in FIGS. 5 and 6B) disposed proximal to the second wide portion 144 and spaced apart from the pair of first intermediate surfaces 178. In some embodiments, each of the pair of second intermediate surfaces 182 extends between the concave central surface 176 and a corresponding second transition surface 172 from the pair of second transition surfaces 172. In some embodiments, each of the pair of second intermediate surfaces 182 curves concavely from the corresponding second transition surface 172 to the concave central surface 176. In some embodiments, each of the pair of second intermediate surfaces 182 includes a second intermediate radius of curvature 184 (shown in FIG. 5). In some embodiments, the first intermediate radius of curvature 180 is equal to the second intermediate radius of curvature 184.

It should be noted that the first and second transition radius of curvatures 168, 174 are shown with a solid line since both the radius of curvatures are measured from outside the body 132 of the tie 130 while the first and second intermediate radius of curvatures 180, 184 are shown with a dashed line since both the radius of curvatures are measured from inside the body 132 of the tie 130.

In some embodiments, the minimum tie thickness 170 is greater than each of the first intermediate radius of curvature 180 and the second intermediate radius of curvature 184 by a second thickness factor of greater than 0.5 and less than or equal to 2. In some embodiments, the second thickness factor is equal to 1.6.

A lower value of the second thickness factor (i.e., a ratio of the minimum tie thickness 170 to the first intermediate radius of curvature 180 or the second intermediate radius of curvature 184) may indicate a smoother transition of the surfaces of the tie 130 along the flow direction F (shown in FIG. 4) of the fluid 122 (shown in FIG. 3A), thereby further reducing the fluid flow losses. In other words, the second thickness factor may indicate that edges of the tie 130 may be blended as smoothly as possible to minimise the flow disruption and the pressure losses.

In some embodiments, a ratio between the minimum tie width 148 and the minimum tie thickness 170 is 3:2. This ratio between the minimum tie width 148 and the minimum tie thickness 170 may maximize a flow area within the fluid passageway 120 (shown in FIGS. 3B and 4) while allowing the tie 130 to be printed with an acceptable surface finish. The tie thickness itself is the primary factor in obtaining acceptable surface finish, the ratio between width and thickness is a secondary factor. Stress may become a limiting factor as the minimum tie thickness 170 is reduced. However, it should be understood that suitable dimensions for the tie 130 may be chosen based on application requirements.

In some embodiments, the elongate portion 146 curves concavely towards the arch 150 at the first longitudinal end 134. In some embodiments, the body 132 further includes an oval cross-sectional shape at the minimum cross-sectional plane 140. This may further reduce the flow disruption and the pressure losses associated with the fluid 122 (shown in FIG. 3A) flowing though the fluid passageway 120 (shown in FIGS. 3B and 4).

Figure 7:
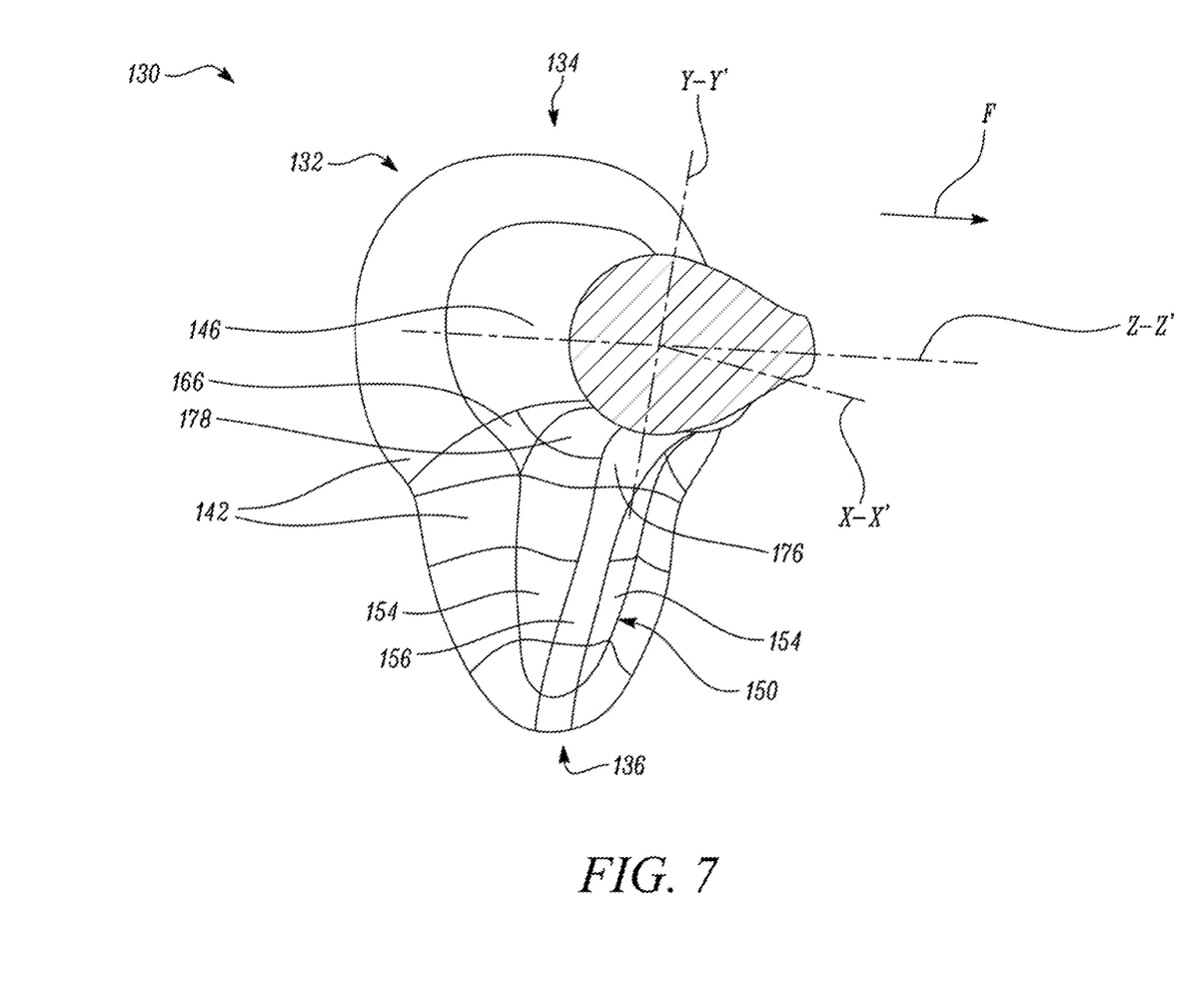
FIG. 7 is a schematic left sectional perspective view of a tie according to another embodiment of the present disclosure.

FIG. 7 is a schematic left sectional perspective view of the tie 130, according to another embodiment of the present disclosure. In the illustrated embodiment of FIG. 7, the body 132 further includes a tear-drop cross-sectional shape at the minimum cross-sectional plane 140 instead of an oval cross-sectional shape shown in FIGS. 6A and 6B. In some embodiments, the tear-drop cross-sectional shape of the body 132 may further reduce the flow disruption and the pressure losses associated with the fluid 122 (shown in FIG. 3A).

Figure 8:
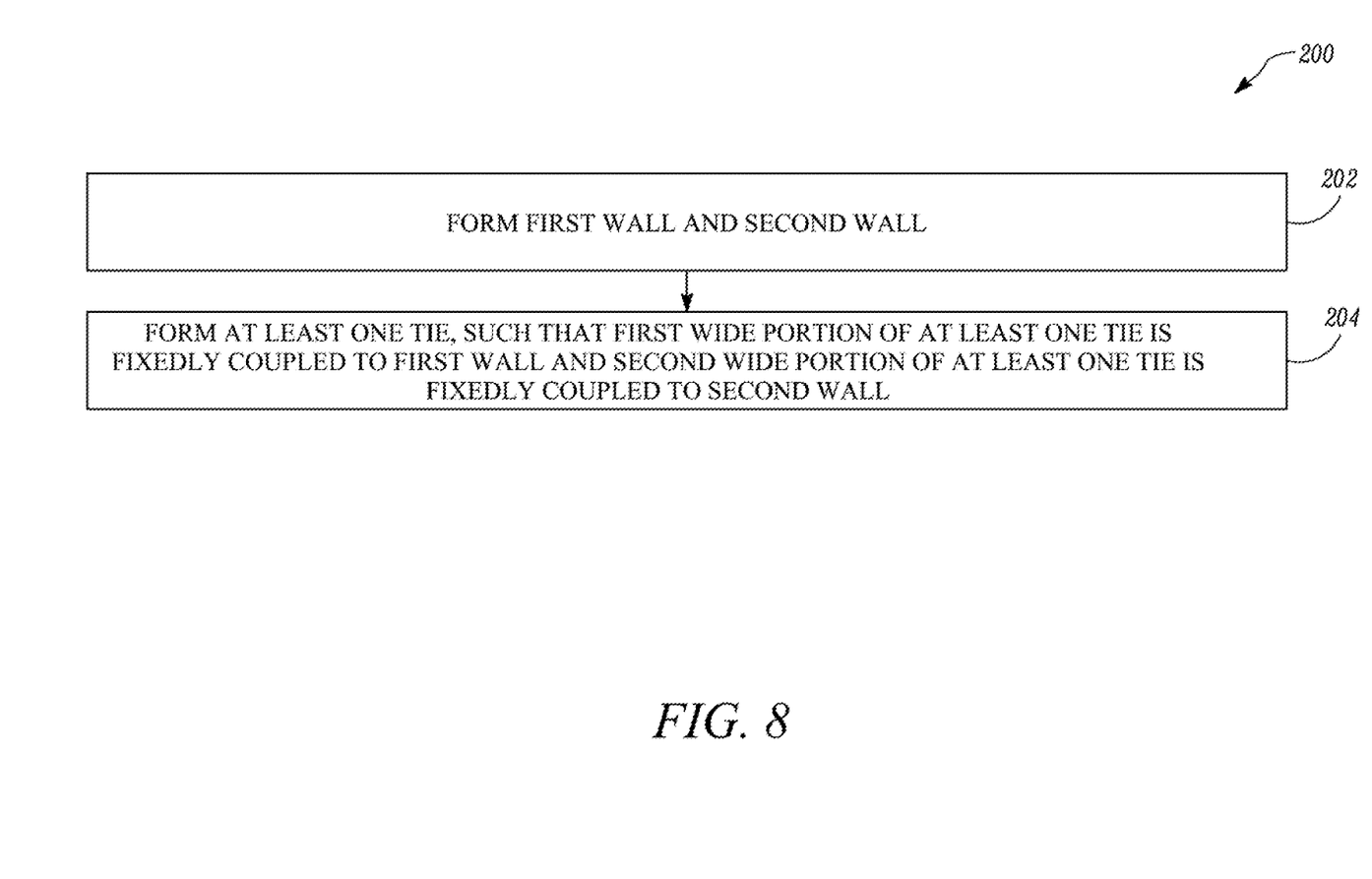
FIG. 8 is a flow chart illustrating a method of manufacturing the component of the gas turbine engine.

FIG. 8 is a flow chart illustrating a method 200 of manufacturing the component 100 of the gas turbine engine 10. The method 200 will be described hereinafter with reference to the component 100 and the tie 130 of FIGS. 3-7.

At step 202, the method 200 includes forming the first wall 116 and the second wall 118 opposing the first wall 116. In some embodiments, the first wall 116 and the second wall 118 define the fluid passageway 120 therebetween. At step 204, the method 200 further includes forming the at least one tie 130, such that the first wide portion 142 of the at least one tie 130 is fixedly coupled to the first wall 116 and the second wide portion 144 of the at least one tie 130 is fixedly coupled to the second wall 118. In some embodiments, the at least one tie 130 is formed by additive layer manufacturing.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A component for a gas turbine engine the component comprising:
a first wall;
a second wall opposing the first wall;
a radially inner end;
a radially outer end opposing the radially inner end;
a fluid passageway defined between the first wall and the second wall, the fluid passageway configured to receive a fluid therein; and
at least one tie disposed in the fluid passageway, wherein the at least one tie comprises:
a body defining a longitudinal axis extending along its length between the first wall and the second wall, a first longitudinal end extending along the longitudinal axis, a second longitudinal end opposing the first longitudinal end and extending along the longitudinal axis, a first transverse axis perpendicular to the longitudinal axis and extending between the first longitudinal end and the second longitudinal end, and a second transverse axis perpendicular to each of the longitudinal axis and the first transverse axis, wherein the body comprises:
a first wide portion fixedly coupled to the first wall;
a second wide portion opposing the first wide portion and fixedly coupled to the second wall;
an elongate portion extending between the first wide portion and the second wide portion along the longitudinal axis, wherein the elongate portion is disposed at the first longitudinal end; and
an arch disposed at the second longitudinal end and adjacent to the elongate portion, the arch extending between the first wide portion and the second wide portion at least partially along the longitudinal axis, wherein the arch curves concavely towards the elongate portion from each of the first wide portion and the second wide portion to an apex of the arch, and wherein the arch comprises:
a pair of first outer curved surfaces opposing each other and curving convexly from the first wide portion at least partially along the second transverse axis;
a pair of second outer curved surfaces opposing each other and curving convexly from the second wide portion at least partially along the second transverse axis;
a first middle surface extending between the pair of first outer curved surfaces with respect to the second transverse axis, the first middle surface comprising a first minimum arch width along the second transverse axis; and
a second middle surface extending between the pair of second outer curved surfaces with respect to the second transverse axis, the second middle surface comprising a second minimum arch width along the second transverse axis;
wherein the body further defines a minimum cross-sectional plane perpendicular to the longitudinal axis and passing through the elongate portion, and wherein the apex of the arch lies within the minimum cross-sectional plane;
wherein the body further comprises a minimum tie width at the minimum cross-sectional plane along the second transverse axis; and wherein the minimum tie width is greater than each of the first minimum arch width and the second minimum arch width by a width factor greater than or equal to 3 to less than or equal to 10; and wherein the fluid flows within the fluid passageway along the second transverse axis of the body of the at least one tie between the radially radial inner end of the component and the radially outer end of the component.

2. The component of claim 1, wherein the width factor is equal to 6.

3. The component of claim 1, wherein the first minimum arch width is equal to the second minimum arch width.

4. The component of claim 1, wherein the body further comprises:
 a pair of first transition surfaces extending from the first wide portion towards the second wide portion and disposed between the elongate portion and respective opposing sides of the arch, each of the pair of first transition surfaces comprising a first transition radius of curvature; and
 a pair of second transition surfaces extending from the second wide portion towards the first wide portion and disposed between the elongate portion and the respective opposing sides of the arch, each of the pair of second transition surfaces comprising a second transition radius of curvature;
 wherein the body further comprises a minimum tie thickness at the minimum cross-sectional plane along the first transverse axis; and
 wherein the minimum tie thickness is greater than each of the first transition radius of curvature and the second transition radius of curvature by a first thickness factor of greater than 1 and less than or equal to 3.

5. The component of claim 4, wherein the first thickness factor is equal to 2.67.

6. The component of claim 4, wherein each of the pair of first transition surfaces curves concavely from the elongate portion to the respective opposing sides of the arch.

7. The component of claim 4, wherein each of the pair of second transition surfaces curves concavely from the elongate portion to the respective opposing sides of the arch.

8. The component of claim 4, wherein the first transition radius of curvature is equal to the second transition radius of curvature.

9. The component of claim 4, wherein the arch further comprises:
 a concave central surface extending between the first middle surface and the second middle surface and intersecting with the minimum cross-sectional plane;
 a pair of first intermediate surfaces disposed proximal to the first wide portion, each of the pair of first intermediate surfaces extending between the concave central surface and a corresponding first transition surface from the pair of first transition surfaces, wherein each of the pair of first intermediate surfaces comprises a first intermediate radius of curvature; and
 a pair of second intermediate surfaces disposed proximal to the second wide portion and spaced apart from the pair of first intermediate surfaces, each of the pair of second intermediate surfaces extending between the concave central surface and a corresponding second transition surface from the pair of second transition surfaces, wherein each of the pair of second intermediate surfaces comprises a second intermediate radius of curvature;
 wherein the minimum tie thickness is greater than each of the first intermediate radius of curvature and the second intermediate radius of curvature by a second thickness factor of greater than −0.5 and less than or equal to 2.

10. The component of claim 9, wherein the second thickness factor is equal to 1.6.

11. The component of claim 9, wherein each of the pair of first intermediate surfaces curves concavely from the corresponding first transition surface to the concave central surface.

12. The component of claim 9, wherein each of the pair of second intermediate surfaces curves concavely from the corresponding second transition surface to the concave central surface.

13. The component of claim 9, wherein the first intermediate radius of curvature is equal to the second intermediate radius of curvature.

14. The component of claim 9, wherein a ratio between the minimum tie width and the minimum tie thickness is 3:2.

15. The component of claim 1, wherein the elongate portion curves concavely towards the arch at the first longitudinal end.

16. The component of claim 1, wherein each of the first wide portion and the second wide portion tapers towards the elongate portion.

17. The component of claim 1, wherein the body further comprises a tear-drop cross-sectional shape or an oval cross-sectional shape at the minimum cross-sectional plane.

18. The component of claim 1, wherein the tie is formed as a single unitary component by additive layer manufacturing.

19. The component of claim 1, wherein the component is a stator vane.

20. A tie for a component having a first wall, a second wall spaced apart from the first wall, and a fluid passageway defined between the first wall and the second wall, the tie comprising:
 a body defining a longitudinal axis extending along its length between the first wall and the second wall, a first longitudinal end extending along the longitudinal axis, a second longitudinal end opposing the first longitudinal end and extending along the longitudinal axis, a first transverse axis perpendicular to the longitudinal axis and extending between the first longitudinal end and the second longitudinal end, and a second transverse axis perpendicular to each of the longitudinal axis and the first transverse axis, wherein the body comprises:
 a first wide portion fixedly coupled to the first wall;
 a second wide portion opposing the first wide portion and fixedly coupled to the second wall;
 an elongate portion extending between the first wide portion and the second wide portion along the longitudinal axis, wherein the elongate portion is disposed at the first longitudinal end;
 a pair of first transition surfaces extending from the first wide portion towards the second wide portion and disposed between the elongate portion and respective opposing sides of the arch, each of the pair of first transition surfaces comprising a first transition radius of curvature; and
 a pair of second transition surfaces extending from the second wide portion towards the first wide portion and disposed between the elongate portion and the respective opposing sides of the arch, each of the pair of second transition surfaces comprising a second transition radius of curvature;

wherein the body further comprises a minimum tie thickness at the minimum cross-sectional plane along the first transverse axis;

wherein the minimum tie thickness is greater than each of the first transition radius of curvature and the second transition radius of curvature by a first thickness factor of greater than 1 and less than or equal to 3; and an arch disposed at the second longitudinal end and adjacent to the elongate portion, the arch extending between the first wide portion and the second wide portion at least partially along the longitudinal axis, wherein the arch curves concavely towards the elongate portion from each of the first wide portion and the second wide portion to an apex of the arch, and wherein the arch comprises:

a pair of first outer curved surfaces opposing each other and curving convexly from the first wide portion at least partially along the second transverse axis;

a pair of second outer curved surfaces opposing each other and curving convexly from the second wide portion at least partially along the second transverse axis;

a first middle surface extending between the pair of first outer curved surfaces with respect to the second transverse axis, the first middle surface comprising a first minimum arch width along the second transverse axis;

a second middle surface extending between the pair of second outer curved surfaces with respect to the second transverse axis, the second middle surface comprising a second minimum arch width along the second transverse axis;

a concave central surface extending between the first middle surface and the second middle surface and intersecting with the minimum cross-sectional plane;

a pair of first intermediate surfaces disposed proximal to the first wide portion, each of the pair of first intermediate surfaces extending between the concave central surface and a corresponding first transition surface from the pair of first transition surfaces, wherein each of the pair of first intermediate surfaces comprises a first intermediate radius of curvature; and a pair of second intermediate surfaces disposed proximal to the second wide portion and spaced apart from the pair of first intermediate surfaces, each of the pair of second intermediate surfaces extending between the concave central surface and a corresponding second transition surface from the pair of second transition surfaces, wherein each of the pair of second intermediate surfaces comprises a second intermediate radius of curvature;

wherein the minimum tie thickness is greater than each of the first intermediate radius of curvature and the second intermediate radius of curvature by a second thickness factor of greater than −0.5 and less than or equal to 2;

wherein the body further defines a minimum cross-sectional plane perpendicular to the longitudinal axis and passing through the elongate portion, and wherein the apex of the arch lies within the minimum cross-sectional plane;

wherein the body further comprises a minimum tie width at the minimum cross-sectional plane along the second transverse axis; and wherein the minimum tie width is greater than each of the first minimum arch width and the second minimum arch width by a width factor greater than or equal to 3 to less than or equal to 10.

\* \* \* \* \*